R. GORTON.
HOOK OR HANGER.
No. 10,888. Reissued Dec. 13, 1887.
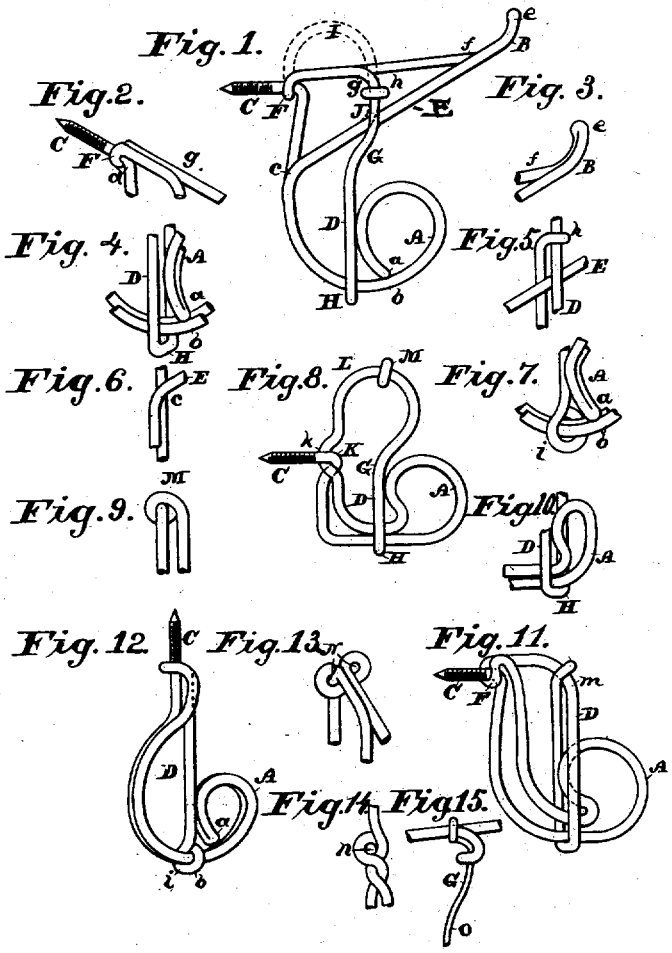
WITNESSES
E. S. Newman
C. M. Newman,
INVENTOR
Robert Gorton,
By his Attorneys
Baldwin Hopkins & Peyton
N. PETERS, Photo-Lithographer, Washington, D. C.

UNITED STATES PATENT OFFICE.

ROBERT GORTON, OF PLAINFIELD, NEW JERSEY.

HOOK OR HANGER.

SPECIFICATION forming part of Reissued Letters Patent No. 10,888, dated December 13, 1887.

Original No. 367,515, dated August 2, 1887. Application for reissue filed September 15, 1887. Serial No. 249,794.

*To all whom it may concern:*

Be it known that I, ROBERT GORTON, of Plainfield, county of Union, and State of New Jersey, have invented certain new and useful Improvements in Hooks or Hangers, of which the following is a specification.

My invention relates to improvements in hangers or hooks especially suitable for suspending wearing-apparel, of the class provided with fastening attachments for securing them to walls, brackets, in wardrobes, &c.; and my objects are to economically provide strong and durable hangers so constructed that they may be readily fastened in place for use, while adapted to securely hold, without injury, the articles which may be supported by and suspended from them.

In accordance with my improvements, hereinafter specifically claimed, the hanger is so shaped as to form a hook for engaging a suspended article and a yielding spring-arm, between which and the hook the suspended article is clamped by spring-pressure, as in self-adjusting jaws.

The accompanying drawings show several forms of hangers made of wire embodying my improvements.

Figure 1 is a side elevation of a doubly-hooked hanger with two modifications, indicated by dotted lines; and Figs. 2 to 6, inclusive, are views in perspective of details thereof, Fig. 2 showing the fastening attachment, Fig. 3 the upper hook, Fig. 4 portions of the lower hook and its yielding arm, Fig. 5 portions of the yielding spring-arm and the brace of the upper hook, and Fig. 6 portions of said brace and that part of the wire which terminates in the fastening attachment. Fig. 7 is a detail view in perspective, designed to show a modification of the yielding arm. Fig. 8 is a side elevation of a one-hook hanger; and Figs. 9 and 10 are views of details thereof, Fig. 9 showing in front elevation the upper portion of the yielding arm, and Fig. 10 the hook and lower portion of its arm in perspective. Fig. 11 is a view in perspective of a modified form of one-hook hanger. Fig. 12 is a similar view of another form of hanger adapted for attachment to a ceiling or to the under surface of a shelf, wardrobe-top, &c. Fig. 13 is a detail view in perspective, representing a modification of the fastening attachment, whereby a hanger, which in general features of construction may be a counterpart of that shown in Fig. 1, is adapted to be secured in place by the aid of ordinary screws or nails; and Fig. 14, a similar view showing a modification, whereby a hanger such, in general respects, as that shown by Fig. 8 is adapted to be fastened by an ordinary screw or nail. Fig. 15 is a detail view showing a modification in accordance with which the yielding arm is made separate from instead of in one piece with the balance of the hanger, which, with the exception of this change in the arm, may be a counterpart of that shown by Fig. 1.

The hanger is best made of wire (preferably steel wire) in one piece, the size of the wire varying for different hangers, much smaller wire being suitable for hangers for light articles—such as towels, aprons, &c.—than for hangers for weighty articles—such as coats, heavy dresses, &c.

A doubly-hooked hanger is shown by Figs. 1 to 6 as formed of one piece of wire, with the lower hook, A, and upper hook, B, both of double wire, a fastening attachment consisting of the screw C at one end of the wire, and the yielding arm D, of double wire, for operating in connection with the lower hook. It will be seen that in producing this hanger the wire is bent or doubled upon itself to form the blunt point *a* of the hook A, and the hook given a rounded or loop-like form, with its point in contact with or close to the wire at the base of the hook at *b*, from whence the double wire curves rearwardly and extends upwardly to *c*, at which point the wire separates, one portion or arm continuing upward to *d*, where it is bent abruptly in a horizontal direction and threaded to form the screw for fastening the hanger in place, and the other portion or arm extending forwardly and inclining upwardly, forming a brace, E, for the upper hook, B, at the blunt point *e* of which the wire is bent or doubled upon itself and brought back, thus forming the upper hook, by suitably bending the wire from the point of the hook to *f*, from whence the wire extends rearwardly, is bent to form a loop, F, passing beneath and engaging the shank of the screw C, from which point the wire extends forwardly, being again double to *g*, where, to form the yielding arm D, it curves downwardly, then rearwardly at G, to give desirable spring to the arm, and next, extending downwardly close to or in contact with the rearmost surface of the lower hook, is bent at H beneath the double wire adjacent to this hook, and then extends upward in a path parallel to that of its descent, and is secured at its end by the eye or loop *h* above the brace E, which passes between the upwardly and downwardly extending portions of the double yielding arm.

The brace E extends rearwardly to the extreme rear edge of the hanger, the two portions of the wire at the point *c* being side by side or in the same transverse plane, and consequently the thrust of the brace will be directly against the wall or surface to which the hanger is secured. By keeping the wires below the point *c* in the same plane and bending them, as shown, to form the hook A, I secure strength and a broad surface of support for the garments. The loop form of spring-arm is desirable, as the garments are securely clamped by it.

To give increased resilience to the yielding arm, and thus guard against an objectionable stiffness which might otherwise result when extra heavy wire is employed, the bow I (shown by dotted lines in Fig. 1) may be made in the arm, extending from the loop F to the curve *g*. In some instances the arm D, instead of being double, may be single, as indicated by Fig. 7, the arm terminating at its lower end in the eye or loop *i*, loosely embracing the double wire near the point of the lower hook.

From the above description it will be seen that the hanger, consisting of a single piece of steel wire, (or its equivalent,) may be quickly secured in position; that articles hung upon the hooks are not liable to injury by having holes punctured in them, the points of the hooks being rounded and quite blunt; that articles, whether light or heavy, thick or thin, when properly hung upon the lower hook by pressing them between the rearmost surface of the hook and its yielding arm, are clamped with spring-pressure, as between jaws, and thus prevented from accidental disengagement from the hook, while readily removable.

It will be understood that as articles cannot be inserted into the loop of the hook or beneath its point their entanglement with the hook and liability to be torn thereby are prevented.

Should a garment be hung on the hanger sufficiently heavy to spring or bend the hook down upon the yielding arm, the arm would serve as a supporter for the hook. When it is desired to have the arm so act, it is made to embrace the hook sufficiently close to support the hook. From Figs. 1 and 4 it will be seen that when the yielding arm is pushed back to hang a garment on the hook its bottom will move away from the bottom of the hook, and that, therefore, it would not serve as a support unless the hook should be forced down considerably. On the other hand, with the construction shown in other figures, the arm would support the hook if it were forced down but slightly; but in all cases the arms act as clamping-jaws to hold the garments.

When the arm is acting as a supporter, obviously the greater the weight of the article suspended from the hook A the greater the tension upon and flexure of the supporter and increase of pressure between it and the hook, the supporter serving at the same time to yieldingly check both downward and inward or backward movement of the hook.

If desired, a one-hook hanger may be provided, constructed in all respects to correspond with the double-hook hanger, except that, instead of extending the brace E forward and upward to form the hook B and then carrying the wire back, as before explained, the wire, passing forwardly and upwardly from *c*, should be curved upwardly, as indicated by dotted lines at J, next curved correspondingly with the curve *g*, then carried back to form the loop F, and again forward, the arm or supporter D being formed as before.

A modified form of hanger having the one hook A is represented by Figs. 8, 9, and 10. In this instance the screw constituting the fastening attachment at one end of the wire projects rearwardly from about midway the height of the hanger, the wire adjacent to the screw being bent, as at K, to engage with the bend *k*, from which the wire extends upwardly, and is curved forwardly and downwardly to form the bow L at the top of the yielding arm or hook-supporter D, the arm having the before-described rearward bend G and bottom loop, H, the end of the wire being secured by the eye M to the bow L upon the completion of the yielding arm.

The hook is spread into loop form, as clearly shown, instead of being formed by two portions of wire extending side by side, or correspondingly curved, as before. From the point or inmost extremity of the hook the wire extends rearwardly and upwardly to the bend *k* and yielding arm or supporter-bow L, as will readily be understood. The resilience of the supporter is obviously increased by the bow or upward extension, and the operation of this form of hanger will readily be understood.

From the above description the construction and operation of the hanger represented by Fig. 11 will be understood without detailed explanation of this modification, which corresponds partly with the hanger shown by Fig. 1 and partly with that shown by Fig. 8, except that the bend G of the yielding arm or hook-supporter is omitted and the supporter made vertical from the curve *m*.

The modification shown by Fig. 12 represents a simple form of hanger adapted for attachment to a horizontal or inclined support—such as a ceiling, under surface of a shelf, &c.

Fig. 13 represents so much of a hanger, which, with the exception of the fastening attachment, may correspond with that shown by Fig. 1, as is needed to show how, by bending the wire to form the eyes N, there is provided a fastening attachment, by which the hanger may be secured in place by the aid of ordinary screws or nails passing through these eyes, instead of employing a fastening attachment consisting of the screw C.

Fig. 14 shows how an eye, *n*, with a fastening screw or nail inserted into it, may be substituted for the fastening attachment C of the hanger shown by Fig. 8.

Fig. 15 shows so much of a hanger as is needed to illustrate a modification applicable to a hanger such, in general features of construction, as that represented by Fig. 1. In accordance with this modification a yielding arm or hook-supporter is formed of a separate piece of wire, O, which, to increase resiliency, may be lighter than that of which the remainder of the hanger is constructed. This hook-supporter is secured by twisting or looping at its upper end to the main wire of the hanger, and at its lower end embraces the hook by a loop, H or *i*, in the manner before explained.

I am aware that it is not new, broadly considered, to construct a hanger of a single piece of wire bent to shape and having a fastening attachment, or to construct such a hanger with two hooks, or to construct a hanger with a yielding clamping-jaw, and therefore I do not unqualifiedly claim hangers so constructed.

I claim as my own invention—

1. The hanger constructed with the hook at its lower end and having the yielding spring-arm or hook-supporter extending near its lower end close to or in contact with the inturned surface of the hook, free to move toward and from the hook, and provided with a fastening attachment, substantially as and for the purpose set forth.

2. The hanger constructed with the fastening attachment, the hook A, and the yielding spring-arm or hook-supporter, between which and the hook the suspended article is clamped, substantially as and for the purpose set forth.

3. The hanger constructed of wire, with the fastening attachment, the hook A, and the yielding spring-arm or hook-supporter having the loop embracing the hook, substantially as and for the purpose set forth.

4. The hanger constructed of a single piece of wire, with the fastening attachment, the upper and lower hooks, and the yielding spring-arm or hook-supporter having the loop embracing the hook, substantially as and for the purpose set forth.

5. The hook or hanger herein described, formed of wire bent into the required shape, in combination with the yielding spring-arm free to move toward and from the hook, between which and the hook garments may be clamped.

6. The combination of a hook or hanger with the double or loop-shaped yielding spring-arm embracing the hook, and between which and the hook garments may be clamped.

7. A hanger formed of bent wire and having a fastening attachment, upper and lower hooks, and a brace, E, extending from the upper hook rearwardly and downwardly to the rear face or edge of the hanger, as described, whereby the thrust of the brace will be directly against the wall or surface to which the hanger is attached.

In testimony whereof I have hereunto set my hand this 12th day of September, 1887.

ROBERT GORTON.

Witnesses:
EDWARD C. DAVIDSON,
LLOYD B. WIGHT.